United States Patent
Shinohara et al.

(10) Patent No.: US 8,715,795 B2
(45) Date of Patent: May 6, 2014

(54) MOLDED PLASTIC PART

(75) Inventors: Ryutaro Shinohara, Hamamatsu (JP); Hisashige Uebayashi, Hamamatsu (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 979 days.

(21) Appl. No.: 11/845,394

(22) Filed: Aug. 27, 2007

(65) Prior Publication Data

US 2008/0118708 A1     May 22, 2008

(30) Foreign Application Priority Data

Aug. 28, 2006    (JP) ................ 2006-230411

(51) Int. Cl.
*B32B 3/10*     (2006.01)
(52) U.S. Cl.
USPC .......... 428/35.7; 428/36.92; 74/443; 74/409; 74/411; 74/440; 74/461
(58) Field of Classification Search
USPC .......... 428/137, 319.3, 131, 319.9, 319.7, 99; 293/155; 74/443, 409, 411, 440, 451
See application file for complete search history.

(56) References Cited

U.S. PATENT DOCUMENTS

| | | | |
|---|---|---|---|
| 7,166,350 B2 | 1/2007 | Murayama | |
| 2003/0159261 A1 | 8/2003 | Kappenstein et al. | |
| 2004/0191475 A1* | 9/2004 | Murayama | 428/137 |
| 2006/0179967 A1* | 8/2006 | Egerter et al. | 74/523 |
| 2006/0222841 A1* | 10/2006 | Masumizu et al. | 428/319.3 |

FOREIGN PATENT DOCUMENTS

| | | |
|---|---|---|
| DE | 3909022 C | 9/1990 |
| EP | 1340668 A2 | 9/2003 |
| JP | 5-53916 | 7/1993 |
| JP | 5-337984 A | 12/1993 |
| JP | 07-047563 | 2/1995 |
| JP | 2000-085495 A | 3/2000 |
| JP | 2000-117778 A | 4/2000 |
| JP | 2004-299597 | 10/2007 |

OTHER PUBLICATIONS

Office Action from German Patent Office dated Oct. 22, 2008; Reference No. OCO 012 GR/CD.
Office Action for Japanese Application No. 2006-230411 dated Dec. 16, 2011.

* cited by examiner

*Primary Examiner* — Ellen S Raudenbush
(74) *Attorney, Agent, or Firm* — Alston & Bird LLP

(57) ABSTRACT

In a molded plastic part 1 including a body 2 constituting a design surface 2a and a reinforcing structure 3 projectingly provided on a design back surface 2b of the body 2, the body 2 and the reinforcing structure 3 being integrally molded by injection molding, the reinforcing structure 3 is formed by a combined body of a plurality of transverse ribs 7a, 7b, 7c and 7d which are arranged at appropriate intervals in the resin flow direction at the time of injection molding in the direction intersecting with the resin flow and longitudinal ribs 6p and 6q which extend at right angles to the transverse ribs and connect the transverse ribs to each other. The transverse ribs are connected to the design back surface 2b, and a gate 8 for injection molding is set on one of the transverse ribs. The longitudinal ribs are disposed so as to be separated from the design back surface 2b.

8 Claims, 9 Drawing Sheets

FIG.1(a)
FIG.1(b)
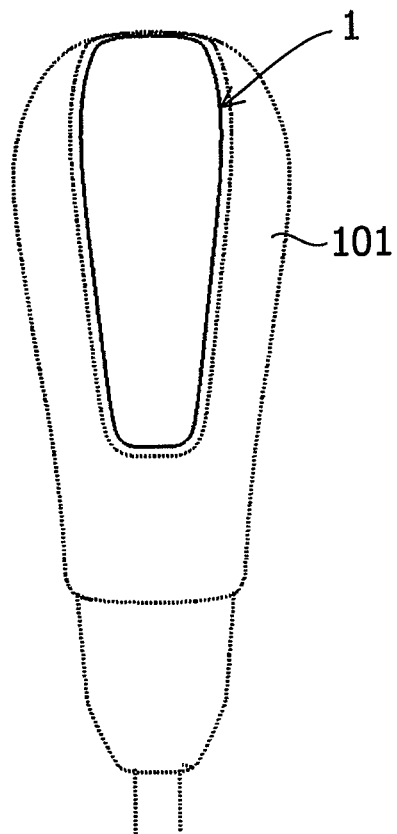
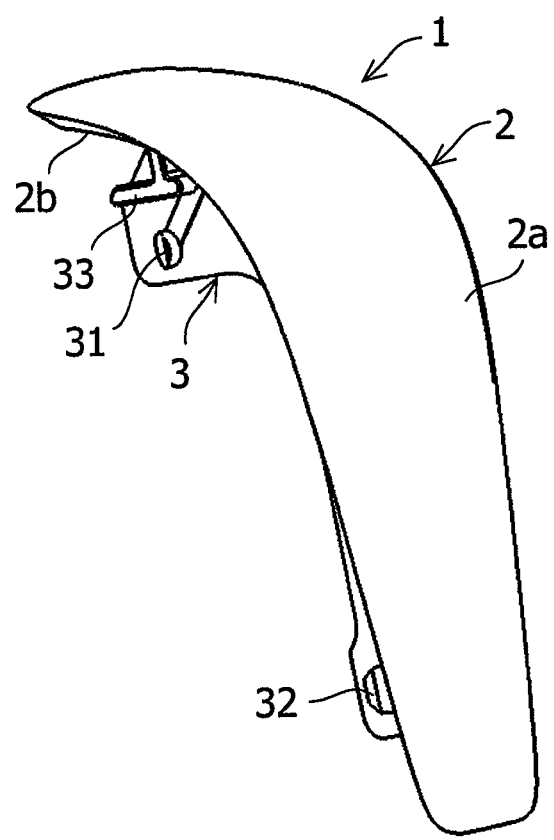

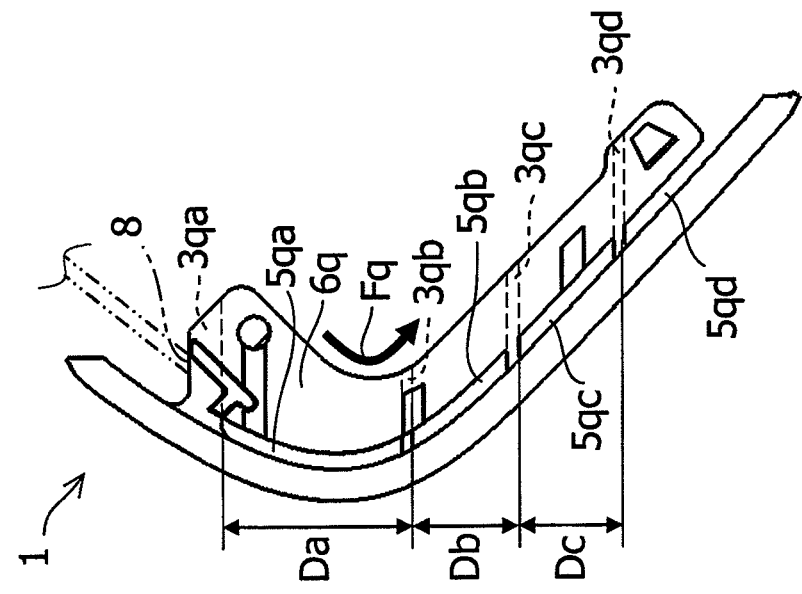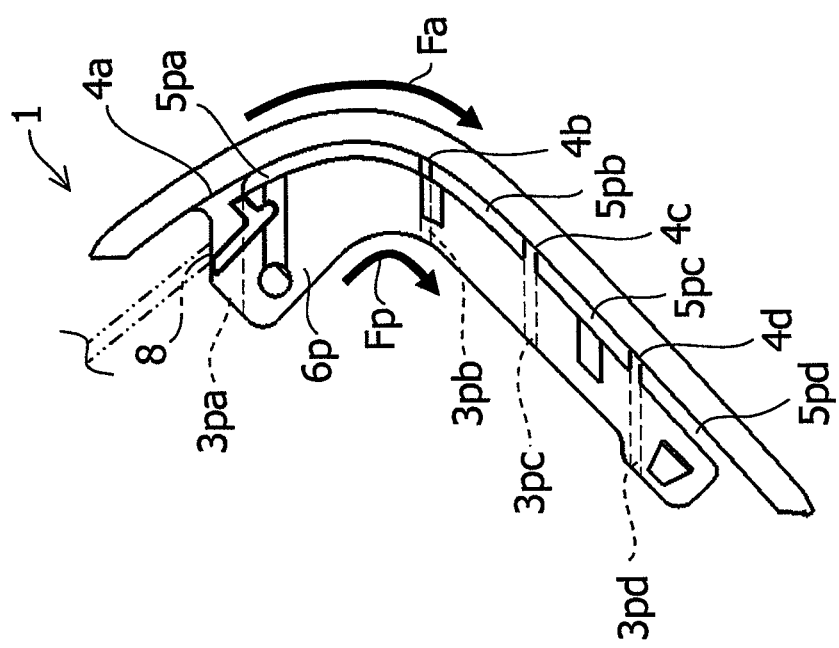

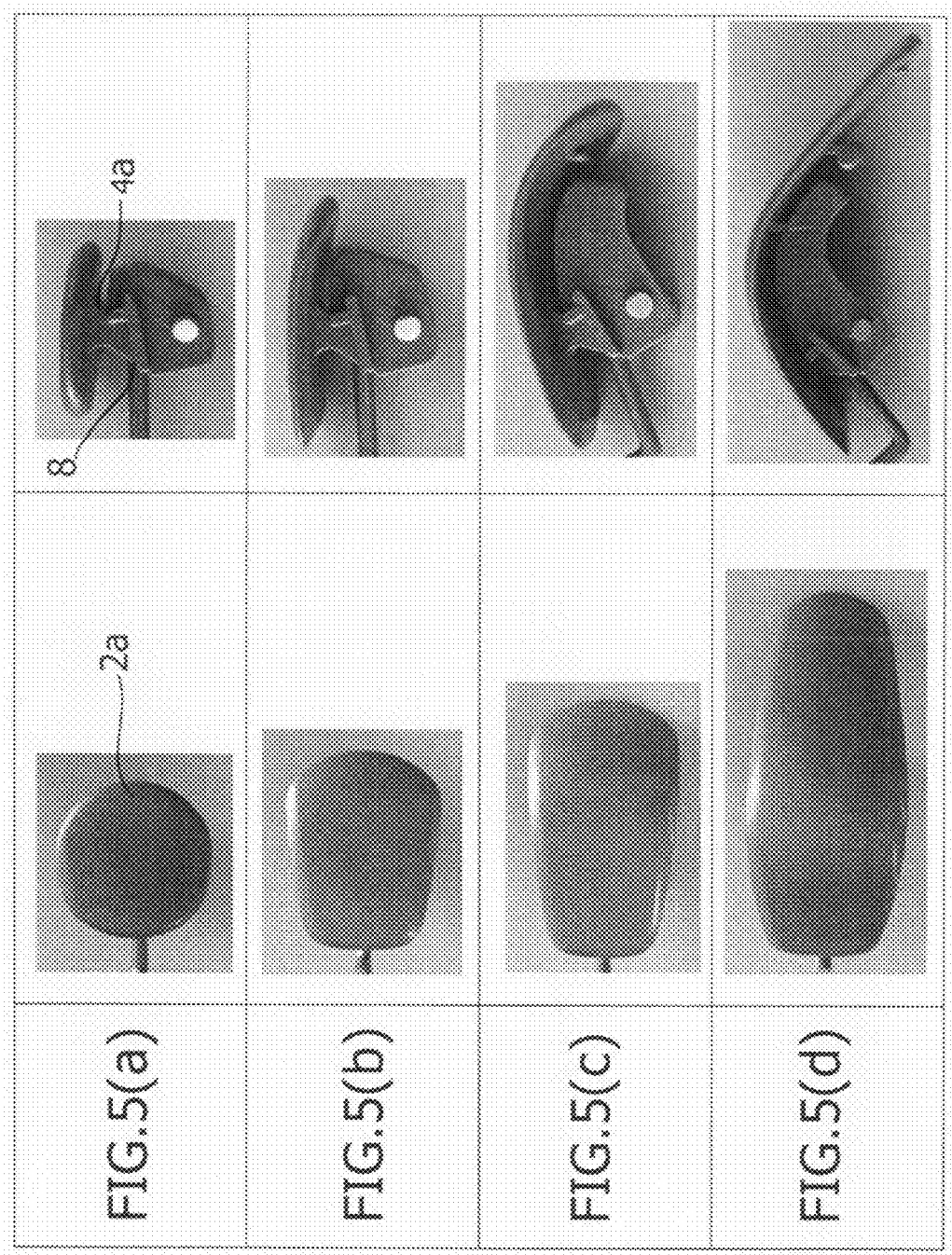

FIG.8(a)
(PRIOR ART)
FIG.8(b)
(PRIOR ART)
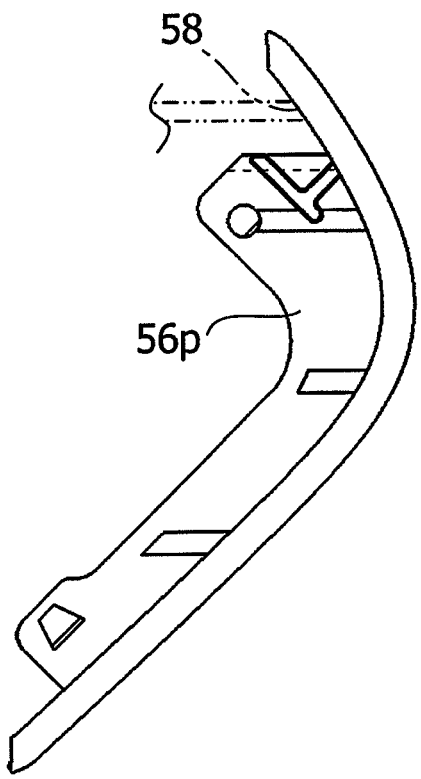
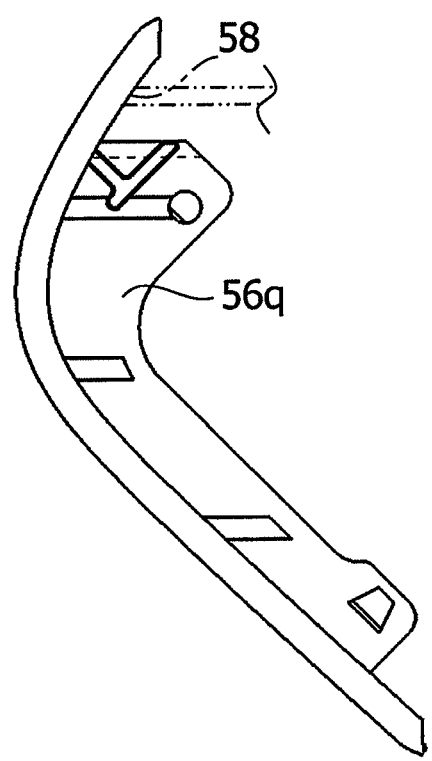

MOLDED PLASTIC PART

CROSS-REFERENCE TO RELATED APPLICATIONS

This application claims priority from Japanese Application No. 2006-230411, filed Aug. 28, 2006, which is hereby incorporated herein by reference.

FIELD OF THE INVENTION

The present invention relates to a molded plastic part integrally molded by injection molding. More particularly, it relates to a molded plastic part that includes a body constituting a design surface and a reinforcing structure projectingly provided on a design back surface of the body, and is mounted to a mounting portion by using the reinforcing structure to cover or decorate the mounting portion by means of the body, and also relates to a molded plastic part suitable for an unpainted molded plastic part, which can prevent an appearance defect such as a flow mark, welding line, or dent (sink mark) from occurring on the design surface.

BACKGROUND OF THE INVENTION

Molded plastic parts manufactured by injection molding have widely been used as interior and exterior parts for automobiles, housings of electrical appliances etc., articles for daily use, and the like because they are light in weight, easily molded into various shapes, and low in cost. In particular, when being used as a covering member or a decorative member for an article surface, such as a cover or a garnish, the molded plastic part not only can easily fit with the shape of the installation portion but at the same time can also be light in weight and manufactured cheaply. Such a resin-made cover or garnish is generally formed into a thin-wall shell construction, and is integrally formed with a reinforcing structure such as a rib, a mounting structure for mounting in a mounting portion, a joint structure for joining the molded components to each other, and the like on the back surface of a design surface (hereinafter referred to as the design back surface) disposed on the outer surface side of an article. In the portion in which these structure parts (hereinafter referred inclusively to as a reinforcing structure part) are formed, the fill of resin is greater than that in other portions, so that a molding defect such as a weld line or a dent is liable to occur on the design surface.

To solve the above problem, JP5-53916U has disclosed measures such that the reinforcing structure part is disposed on the back surface of a portion concealed after mounting, avoiding a portion conspicuous in appearance, so that even if a dent occurs on the design surface side, the appearance is not affected, and measures such that in the portion conspicuous in appearance, the thickness of a connecting part connecting with the reinforcing structure part is made small to restrain a dent. However, it is difficult for these measures to be taken for a part in which the whole of design surface is arranged at a conspicuous position, and additionally, if the thickness of the connecting part is made small, a decrease in strength caused by stress concentration is inevitable. Therefore, these measures are not effective or universal.

To improve the texture of a molded plastic part, the molded plastic part may be painted after molding. However, in recent years, from the viewpoint of environmental protection, in a situation where a demand for reducing environmental pollutants emitted in the manufacturing process increases, there is the risk that volatile organic compounds contained in general paints are released into the atmosphere and adversely impact the environment. Accordingly, the use of a solvent in place of the volatile organic compound, the reduction in quantity consumed of paint itself, and the like have been considered as measures thereagainst.

On the other hand, a method being increasingly used obtains a molded plastic part providing satisfactory texture without painting by performing injection molding using a colored resin that has actually been colored in advance by a coloring matter such as a pigment, a dye, or the like. Advantages of unpainted molded plastic parts manufactured by using a colored resin include the fact that no volatile organic compounds are generated and that costs can be reduced by the omission of the painting process. Another advantage is that the texture can be maintained for many years because the paint film does not peel off.

Also, a method has been used in which to enhance the texture of unpainted molded plastic part manufactured by using the colored resin, a bright material such as aluminum flakes and glass flakes is added to the colored resin, by which a metallic or bright texture is given to the molded plastic part. However, an injection molding process using a bright material has the problem that the flow state of the resin in the mold at the time of molding tends to appear on the design surface after molding. Therefore, if the flow of resin at the time of injection molding is uneven, a portion having a different color tone is produced, which is recognized as an appearance defect.

Examples of such an appearance defect occurring on the design surface due to an uneven resin flow include a weld line and a flow mark. Although these defects also occur in the case of general resin materials other than colored resins, they especially appear on injection molded components manufactured by using the colored resin, and the number of cases recognized as an appearance defect increases. Therefore, when an unpainted molded plastic part manufactured by using a colored resin is used as a product, it is necessary to more effectively restrain the occurrence of these defects.

Next, the causes for the occurrence of the above-described molding defects are described in detail by giving a specific example.

FIGS. 6 to 8 show a shift lever knob garnish 51 mounted on an automotive shift lever 501, which is molded by a conventional general method. FIG. 6A shows typical weld lines Wp and Wq and a typical flow mark M occurring on the design surface when the shift lever knob garnish 51 is injection molded.

Generally, since a gate through which molten resin is poured into the cavity of an injection molding die leaves its cut traces after molding, the gate is set at a location as inconspicuous as possible. Also, a reinforcing rib etc. provided on the design back surface of a molded part body constituting the design surface is generally made thinner than the body. In the example shown in FIGS. 6 to 8, a gate 58 is set on a design back surface 52b close to the end edge so that resin can be filled surely in a molded part body 52 to allow the resin to flow into the rib (a reinforcing part 53) from the body part 52 side.

In this case, however, the flow mark M is liable to occur on the design surface on the side opposite to the gate of the molded part body 52. This flow mark M is caused by a phenomenon that the flow of resin arriving at the inner surface corresponding to a design surface 52a of the interior of the die is in a jet state. In the case of a gate with a set up boss, described later, as shown in FIG. 9, even at a level that is not recognized as an appearance defect for the ordinary molded component, a difference in color tone is recognized in the injection molding using a bright material.

A flow mark does not occur if the gate through which resin is poured is provided in the direction parallel with the design surface, such as a side gate or a film gate. In this case, however, after the gate has been separated from the molded component, the cut surface is conspicuous, so that in many molded plastic parts, this type of gate cannot be used from the viewpoint of product appearance. Therefore, in the case of a molded plastic part in which the outer periphery of design surface is also visible to the passengers, such as the shift lever knob garnish, it is necessary to pour resin from the back surface side of the molded part body as described above, meaning that measures against the flow mark become indispensable.

Further, the reinforcing part 53 projectingly provided on the design back surface 52b of the body part 52 is made up of ribs 56p and 56q and a rib 57 that connects these ribs 56p and 56q to each other in the width direction in the end portion close to the gate 58, and all of these three ribs are provided so as to be erected from the design back surface 52b. On the design surface 52a of the molded part body 52 at the location where these ribs 56p, 56q and 57 are present, the tip end shape of resin flow sometimes exhibits unevenness having a concave shape locally, which may cause a weld line.

FIG. 9 shows images obtained in the case where short shots are performed intentionally to check the actual injection molding process of the shift lever knob garnish 51, and molded components of four stages in which the filling of resin is not finished are injection molded. From the left-hand side images, the forming process of the design surface can be observed, and from the right-hand side images, the forming process of the body part 52 and the reinforcing part 53 can be observed. Images (a) show the forming states immediately after the start of injection molding, images (d) show the forming states immediately before the finish, and images (b) and (c) show transient forming states between the forming states shown in images (a) and (d). It is found that in the forming states shown in images (c) and (d) of these four forming states, the tip end shape of resin flow is concave locally, and therefore the weld lines Wp and Wq shown in FIG. 6A occur.

As described above, the weld line occurring when the molded plastic part is formed by injection molding the colored resin is caused by the phenomenon that the resin flow is delayed locally in the forming process, and therefore the tip end shape of flow becomes concave locally. To solve this problem, a molded plastic part is required which has a shape and construction such that the flow of resin is even as a whole, the occurrence of a local concave shape at the tip end of flow is prevented, the occurrence of a weld line can be restrained, and a problem of insufficient rigidity or the like is not caused.

BRIEF SUMMARY OF THE INVENTION

The present invention has been made in view of the above circumstances. Accordingly, it is an object of the present invention to provide a molded plastic part that can prevent an appearance defect such as a flow mark, weld line, or dent occurring on the design surface side of a molded part body constituting a design surface without impairing the rigidity of a reinforcing structure part provided on the back surface of the molded part body and the function of a mounting means, and that is suitable for unpainted resin molding using a colored resin, especially for the injection molding in which a bright material is added to the colored resin.

To solve the problems with the related art, the present invention provides a molded plastic part including a body part constituting a design surface and a reinforcing structure part projectingly provided on a design back surface of the body part, the body part and the reinforcing structure part being integrally molded by injection molding, wherein the reinforcing structure part is formed by a combined body of a plurality of transverse ribs which are arranged at appropriate intervals in the resin flow direction at the time of injection molding in the direction intersecting with the resin flow and a longitudinal rib which extends at right angles to the transverse ribs and connects the transverse ribs to each other, the transverse ribs are connected to the design back surface, and a gate part for injection molding is set on one of the transverse ribs, and on the other hand, the longitudinal rib is disposed so as to be separated from the design back surface.

With the above-described configuration, the molded plastic part is made such that while the rigidity of a reinforcing structure part is secured by the plurality of transverse ribs and the longitudinal rib, a reinforcing structure part such as a rib extending along the inflow direction of resin is absent on the design back surface so that a weld line occurring on the design surface side of the molded part body can be prevented, and also resin flows into the body part through the transverse rib on which the gate part is set at the time of injection molding, and at this time, the resin flows dividedly from the transverse rib to the longitudinal rib, whereby the inflow velocity is decreased. Therefore, the resin does not arrive at the design surface in a jet state, so that an appearance defect such as a flow mark or a dent can be prevented. For this reason, the molded plastic part in accordance with the present invention is best suitable for unpainted resin molding using a colored resin, especially for injection molding in which a bright material is added to the colored resin.

Also, in a mode in which the transverse rib on which the gate part is set has a wall thickness larger than that of any of other transverse ribs, the inflow velocity of resin flowing in through the transverse rib on which the gate part is set is further decreased, so that the jet state does not appear, whereby the occurrence of a flow mark can be prevented surely. Further, in a mode in which the transverse rib on which the gate part is set has a fillet part expanding to the design back surface side provided in a portion in which the transverse rib connects with the design back surface, when the resin flows into the body part through the transverse rib on which the gate part is set at the time of injection molding, the inflow velocity of resin is decreased, so that the occurrence of a flow mark on the design surface of the body part can be prevented surely.

In a mode in which the wall thickness of the longitudinal rib is smaller than the wall thickness of the body part, and the interval between the transverse rib on which the gate part is set and the adjacent transverse rib is greater than any of the intervals between the transverse ribs on which the gate part is not set, the resin flowing into the body part from one of the transverse ribs advances earlier than the resin flowing into the longitudinal rib from the transverse rib, by which the resin is restrained from flowing into the body part from the transverse rib through other transverse ribs. Therefore, the occurrence of a weld line caused by the joining of resins on the design surface is prevented.

Therefore, in a mode in which a joining location where the resin which flows in from one of the transverse ribs through the body part and solidifies and the resin which flows in from one of the transverse ribs through the longitudinal rib and solidifies join lies in the reinforcing structure part, the occurrence of a weld line and an appearance defect caused by the weld line are prevented surely, so that a high-quality molded plastic part can be obtained.

Due to the above features, the present invention is best suited for a molded plastic part used as a covering member or a decorative member for an article surface, such as a cover or a garnish, which is light in weight and can be manufactured cheaply.

BRIEF DESCRIPTION OF THE SEVERAL VIEWS OF THE DRAWINGS

FIG. 1A is a schematic view of an essential portion of a shift lever knob provided with a shift lever knob garnish, and FIG. 1B is a perspective view of the shift lever knob garnish;

FIG. 4A is a right side view of FIG. 3A, and FIG. 4B is a left side view thereof;

FIG. 5A-FIG. 5D are images showing the forming process of a shift lever knob garnish in accordance with an embodiment of the present invention;

FIG. 8A is a right side view of FIG. 7A, and FIG. 8B is a left side view thereof.

DETAILED DESCRIPTION OF THE INVENTION

The present invention will now be described in detail with reference to the following embodiment.

Figure 2:
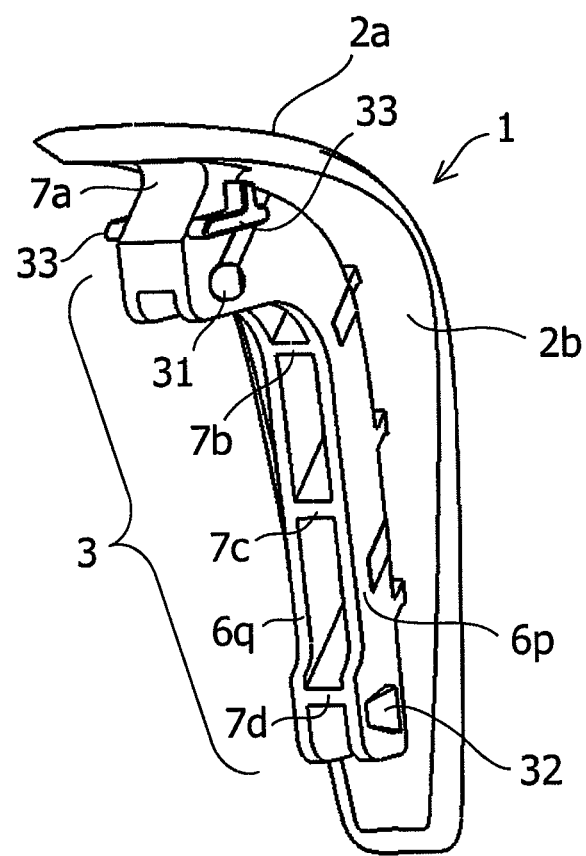
FIG. 2 is a perspective view of a shift lever knob garnish in accordance with an embodiment of the present invention.
Figure 3A:
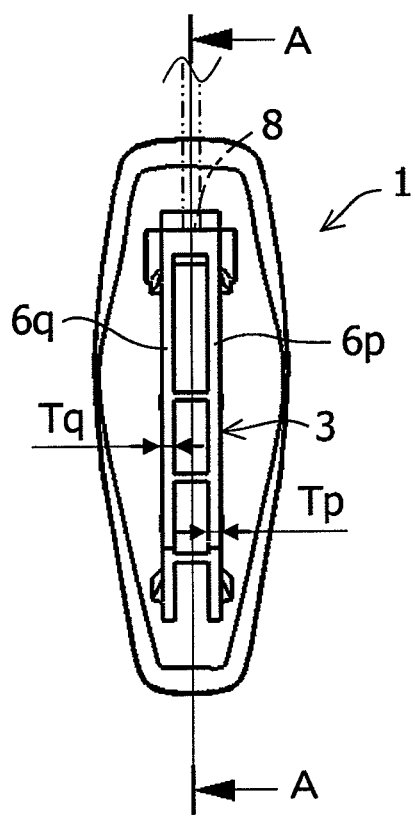
FIG. 3A is a front view showing the design back surface of a shift lever knob garnish in accordance with an embodiment of the present invention.
Figure 3B:
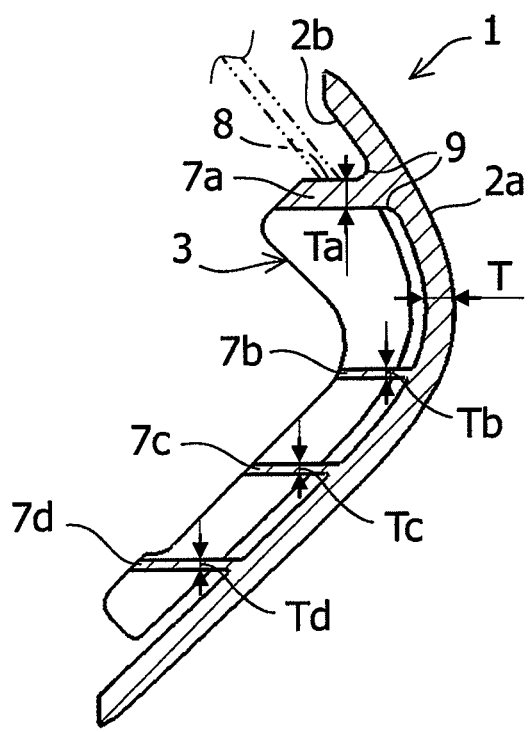
FIG. 3B is a sectional view taken along the line A-A of FIG. 3A.
Figure 6A:
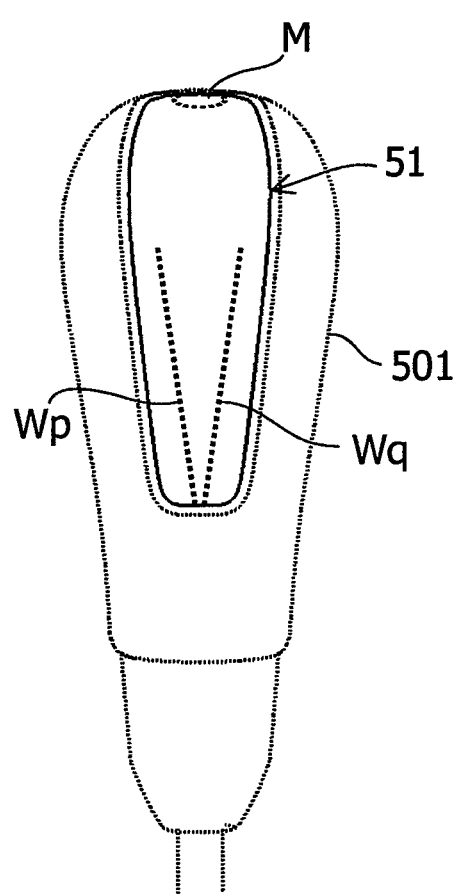
FIG. 6A is a schematic view of an essential portion of a shift lever knob provided with a conventional shift lever knob garnish.
Figure 6B:
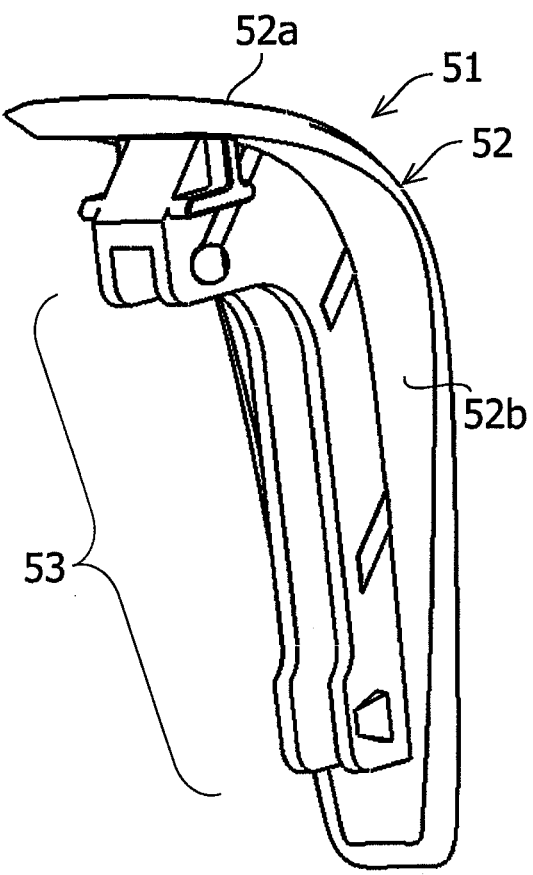
FIG. 6B is a perspective view of the shift lever knob garnish.
Figure 7A:
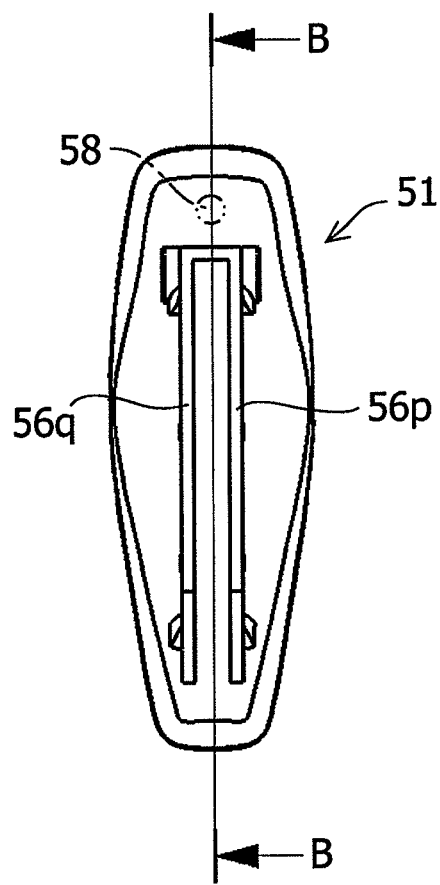
FIG. 7A is a front view showing the design back surface of a conventional shift lever knob garnish.
Figure 7B:
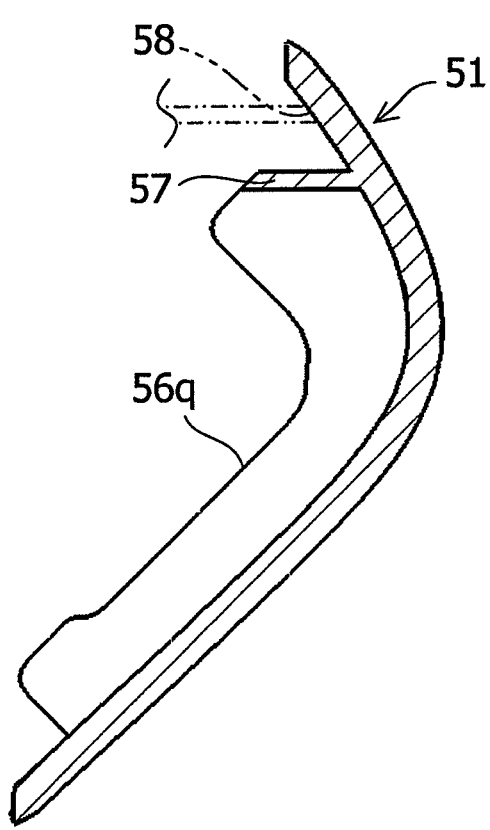
FIG. 7B is a sectional view taken along the line B-B of FIG. 7A.
Figures 9A, 9B, 9C, 9D:
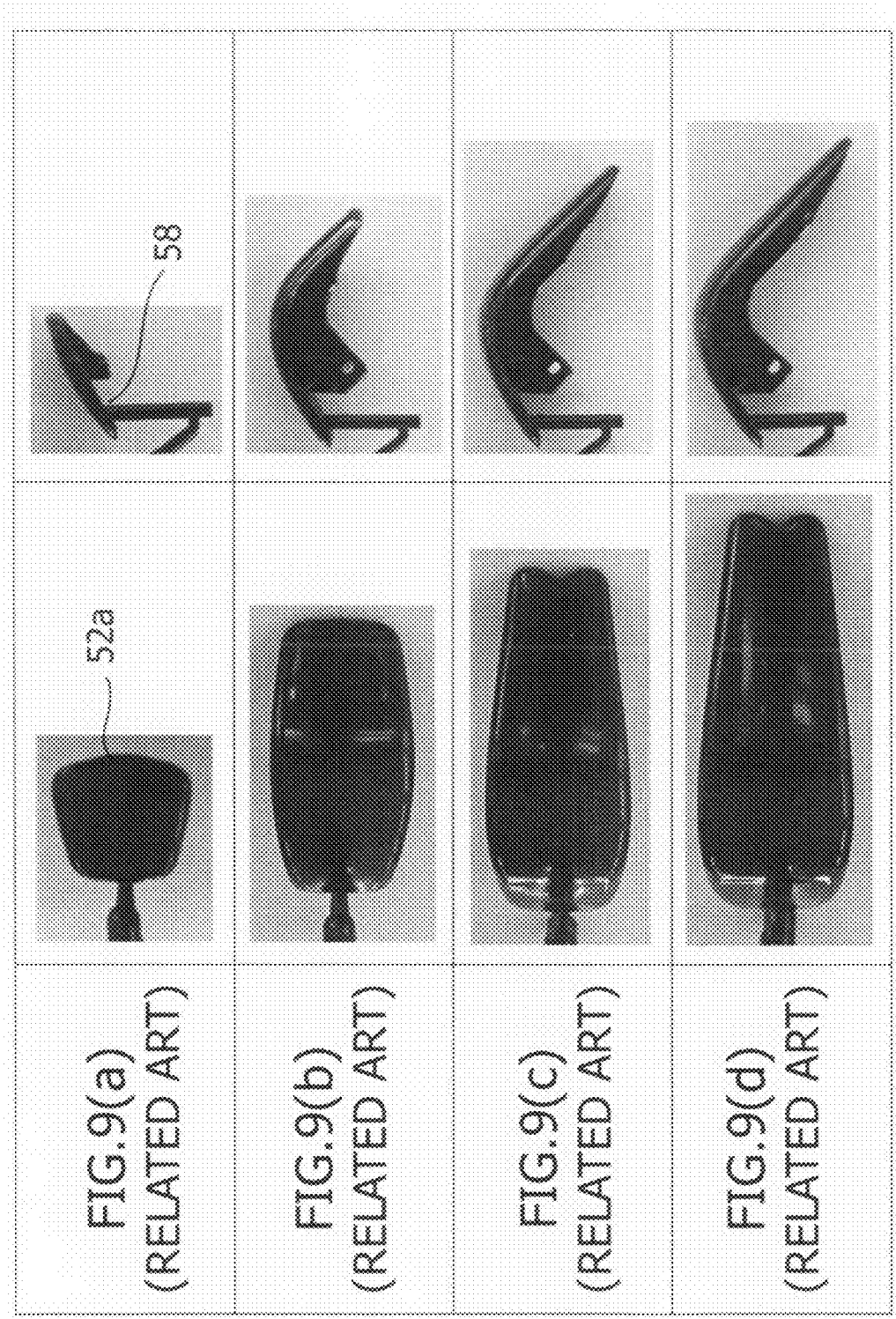
FIG. 9A-FIG. 9D are images showing the forming process of a shift lever knob garnish based on a conventional method.

FIG. 1A shows an automotive shift lever knob 101. In FIG. 1A, the shift lever knob 101 is mounted with a shift lever knob garnish 1 of a molded plastic part constituting a decorative body. As shown in FIG. 1B and FIGS. 2 to 4, the shift lever knob garnish 1 is a molded plastic part in which a body part 2 constituting a design surface 2a and a reinforcing structure part 3 projectingly provided on a design back surface 2b are integrally molded by injection molding using a colored resin. The body part 2 and the reinforcing structure part 3 are curved along the curved surface shape of the shift lever knob 101.

The reinforcing structure part 3 is formed by a combined body of four transverse ribs 7a, 7b, 7c and 7d arranged in the direction intersecting with the lengthwise direction of the body part 2, namely, in the width direction and two longitudinal ribs 6p and 6q that extend at right angles to the transverse ribs 7a, 7b, 7c and 7d to connect the transverse ribs to each other. The transverse ribs 7a, 7b, 7c and 7d are connected to the design back surface 2b in connecting parts 4a, 4b, 4c and 4d, respectively. In contrast, the longitudinal ribs 6p and 6q are disposed so as to be separate from the design back surface 2b, and clearances 5pa, 5pb, 5pc, 5pd, 5qa, 5qb, 5qc and 5qd are formed between the longitudinal ribs 6p and 6q and the design back surface 2b.

That is to say, the longitudinal ribs 6p and 6q are connected to the transverse rib 7a in connecting parts 3pa and 3qa, respectively, to the transverse rib 7b in connecting parts 3pb and 3qb, respectively, to the transverse rib 7c in connecting parts 3pc and 3qc, respectively, and to the transverse rib 7d in connecting parts 3pd and 3qd, respectively. Also, the transverse ribs 7a, 7b, 7c and 7d are separated so as to have arrangement intervals described below. From the upside, the transverse ribs 7a and 7b are arranged at an interval Da, the transverse ribs 7b and 7c are arranged at an interval Db, and the transverse ribs 7c and 7d are arranged at an interval Dc. Of the four transverse ribs, the transverse rib 7a located at the uppermost position (hereinafter referred to as a first transverse rib) is formed so as to have a wall thickness larger than the wall thickness of any of the transverse ribs 7b, 7c and 7d, and a gate 8 is provided on the surface located above in the figure of the first transverse rib 7a to pour resin into the cavity of a die at the time of injection molding.

For the shift lever knob garnish 1 shown in the figures, the wall thickness T of the body part 2 is 2.0 to 3.0 mm, and each of the wall thicknesses Tp and Tq of both of the longitudinal ribs 6p and 6q is 1.5 mm. The wall thickness Ta of the transverse rib 7a is 3.0 mm, whereas each of the wall thicknesses Tb, Tc and Td of the transverse ribs 7b, 7c and 7d is 1.0 mm. The diameter of the gate 8 is 2.0 mm.

The reinforcing structure part 3 is also used as a mounting part for mounting the shift lever knob garnish 1 on the shift lever knob 101. Therefore, on the side surface of each of the longitudinal ribs 6p and 6q of the reinforcing structure part 3, locking claws 31 and 32 and a guide edge 33 are projectingly provided. In mounting the shift lever knob garnish 1, the reinforcing structure part 3 is advanced along the guide edges 33, and insertedly fitted in the mounting location (not shown) of the shift lever knob 101, and the locking claws 31 and 32 are locked on the inner surface of the shift lever knob 101.

Next, the relationship between the configuration and the operation and effect of the present invention is explained along the flow of resin at the time of injection molding of the shift lever knob garnish 1 based on the above-described embodiment.

At the time of injection molding of the shift lever knob garnish 1, a colored resin is allowed to flow into a cavity for forming the first transverse rib 7a (hereinafter referred to as "allowed to flow into the first transverse rib 7a" and so on) through the gate 8, which is a charging port into the cavity of an injection molding die. The resin flowing into the first transverse rib 7a is divided into three flow routes consisting of a route Fa on which the resin flows in along the body part 2, a route Fp on which the resin flows in along the longitudinal rib 6p, and a route Fq on which the resin flows in along the longitudinal rib 6q.

The resin flowing in along the route Fa is less liable to become in a jet state because the flow rate thereof is decreased by the division of flow when the resin flows into the body part 2 through the connecting part 4a between the first transverse rib 7a and the design back surface 2b. Also, since the wall thickness Ta of the first transverse rib 7a is larger than the wall thicknesses of other transverse ribs (for example, 3.0 mm), the inflow velocity of resin into the body part is further decreased, by which as well the appearance of a jet flow is restrained.

Further, by providing a fillet 9, which is expanded into an arc shape in cross section toward the design back surface 2b side, in the connecting part 4a between the first transverse rib 7a and the design back surface 2b, the connecting part 4a is expanded gradually in the inflow direction of resin, so that a further velocity decreasing effect can be achieved, and also the flow of resin becomes smooth. By these configurations, the inflow velocity of resin is decreased in the vicinity of the connecting part 4a, whereby the occurrence of a flow mark on the design surface 2a of the body part 2 is prevented. The cross-sectional shape of the fillet 9 is not limited to the arc shape, and may be a taper shape or the like.

The increase in the wall thickness Ta contributes to the enhancement in rigidity of the reinforcing structure part 3. In the case where the wall thickness Ta is made larger than usual, and the fillet 9 is provided in the connecting part 4a, there is a fear of occurrence of a dent on the design surface 2a opposed to the connecting part 4a. However, since the first transverse rib 7a is provided with the gate 8, and a pressure is applied until the gate is solidified, no dent occurs, and an appearance problem does not arise including this respect.

The resin divided into three flow routes flows toward the second transverse rib 7b through each route. The resin on the route Fa flowing in the body part 2 arrives at the second transverse rib 7b in the connecting part 4b, the resin on the route Fp flowing in the longitudinal rib 6p arrives at the second transverse rib 7b in the connecting part 3pb, and the resin on the route Fq flowing in the longitudinal rib 6q arrives at the second transverse rib 7b in the connecting part 3qb. Since each of the wall thicknesses Tp and Tq of the longitudinal ribs 6p and 6q is 1.5 mm, being smaller than the wall thickness T of the body part 2, which is 2.0 to 3.0 mm, the flow of resin in the route Fa passing through the body part 2 is faster than the flow of resin in the routes Fp and Fq passing through the longitudinal ribs 6p and 6q. Also, the interval Da between the first transverse rib 7a and the second transverse rib 7b is set so as to be 20 mm, being greater than Db or Dc.

Therefore, the flow distance from the first transverse rib 7a to the second transverse rib 7b on the route Fa is longer than that on the route Fp or Fq. However, the resin passing through the route Fa arrives at the second transverse rib 7b earliest because of the above-described difference in velocity and the interval Da capable of compensating the increase in distance by means of the difference in velocity. Therefore, the joining location of resins on the three routes lies in the second transverse rib 7b or in the longitudinal ribs 6p and 6, not in the body part 2, so that a weld line caused by the joining of resins on the design surface 2a does not occur. Further, since the second transverse rib 7b is arranged at right angles to the flow direction of resin, and the wall thickness Tb is kept as small as 1.0 mm, the resin on the route Fa that passes through the second transverse rib 7b and flows in the body part 2 does not produce a weld line because the tip end shape of resin flow does not become concave.

The resins on the three routes Fa, Fp and Fq flow toward the third transverse rib 7c. The resin on the route Fa flowing in the body part 2 arrives at the third transverse rib 7c in the connecting part 4c, the resin on the route Fp flowing in the longitudinal rib 6p arrives at the third transverse rib 7c in the connecting part 3pc, and the resin on the route Fq flowing in the longitudinal rib 6q arrives at the third transverse rib 7c in the connecting part 3qc. As described above, each of the wall thicknesses Tp and Tq of the longitudinal ribs 6p and 6q is 1.5 mm, being smaller than the wall thickness T of the body part 2, which is 2.0 to 3.0 mm, the resin on the route Fa arrives at the second transverse rib 7b earliest. Therefore, naturally, the resin on the route Fa arrives at the third transverse rib 7c earliest. The same holds true for the transverse rib on the resin flow downstream side of the third transverse rib 7c (the fourth transverse rib 7d).

Therefore, for the third transverse rib 7c, the interval Db from the second transverse rib 7b is decreased arbitrarily so that a plurality of transverse ribs can be disposed, by which a demand for securing the rigidity of the reinforcing structure part 3 can be met. In the present invention, each of the intervals Db and Dc between the adjacent ribs under the second transverse rib 7b is made 10 mm, and two transverse ribs of the third transverse rib 7c and the fourth transverse rib 7d are disposed, so that the rigidity of the reinforcing structure part 3 can be improved. Further, the resin on the route Fa passing through these transverse ribs does not produce a weld line because the tip end shape of resin flow does not become concave in the same manner as described above.

FIG. 5 shows images of "intentional short shots" in which the actual forming process of the shift lever knob garnish 1 of this embodiment is divided into four stages. From the left-hand side images, the forming process of the design surface 2a can be observed, and from the right-hand side images, the forming process of the body part 2 and the reinforcing part 3 can be observed. Images (a) in FIG. 5 show the forming states immediately after the start of molding, images (d) show the forming states immediately before the finish, and images (b) and (c) show transient forming states between the forming states shown in images (a) and (d). In the forming process from images (a) to images (d), in spite of the presence of the three transverse ribs of the second transverse rib 7b, the third transverse rib 7c, and the fourth transverse rib 7d on the design back surface 2b, the tip end shape of resin flow on the design surface 2a is always maintained so as to be concave, so that there is no room for the occurrence of weld line. Also, the resin does not become in a jet state even in the connecting part 4a through which the resin flows from the first transverse rib 7a into the body part 2.

The above description indicates that the molded plastic part in accordance with the present invention is a molded plastic part in which the molded part body having the design surface that forms the inner surface when the molded component is mounted on an automotive part etc. and the reinforcing structure part disposed on the back surface of the design surface are integrally molded by injection molding a colored resin, and a side gate or a film gate cannot be used as a resin charging port leading to the cavity of the injection molding die, and that there can be provided an unpainted molded plastic part in which the reinforcing structure part ensures functions of reinforcing the molded part body and mounting the molded component on the automotive part, and an appearance defect such as a weld line and a flow mark does not occur on the design surface.

In the above-described embodiment, the case where the reinforcing structure part 3 is formed by the combined body of the four transverse ribs 7a, 7b, 7c and 7d and the two longitudinal ribs 6p and 6q is shown. However, the number of transverse ribs and longitudinal ribs is not limited to the above-described number, and can be set in an arbitrary manner on condition that two transverse ribs and one longitudinal rib are the minimum configuration. Also, in the above-described embodiment, the molded plastic part 1 in which the body part 2 is curved to the design back surface 2b side is shown. However, the present invention can be carried out as a molded plastic part in which the body part is curved or bent to the side (the width direction) in the design surface. In this case, "the lengthwise direction of the body part" is not the direction such that both ends in the lengthwise direction of the body part are connected linearly, but the direction along a curve connecting the intermediate points in the width direction of the body part.

The above is the description of the embodiment of the present invention given by taking the automotive shift lever knob garnish as an example. The present invention is not limited to the above-described embodiment, and can be carried out as a molded plastic part having the body part constituting the design surface and the reinforcing structure part projectingly provided on the design back surface of the body part, such as not only another interior or exterior part for an automobile but also a covering member for covering the surface of an article and a decorative member. In this case, it is a matter of course that various modifications and changes can be made based on the technical concept of the present invention.

What is claimed is:

1. A molded plastic part comprising a body constituting a design surface, and a reinforcing structure projectingly provided on a design back surface of the body, the body and the reinforcing structure being monolithically molded as one piece by injection molding at one time, in one injection mold, from the same molten plastic injected through the same gate, wherein
   the reinforcing structure is formed by a combination of (i) a plurality of transverse ribs which are arranged at appropriate intervals in a longitudinal direction of the body, and each transverse rib extends in the direction intersecting with the longitudinal direction of the body; and (ii) at least one longitudinal rib which extends in the longitudinal direction of the body at right angles to the transverse ribs and connects the transverse ribs to each other,
   the transverse ribs are connected to the design back surface; one of the transverse ribs is provided as a first transverse rib on which the gate is located; and
   the at least one longitudinal rib is disposed so as to be separated from the design back surface via clearances between the at least one longitudinal rib and the design back surface.

2. The molded plastic part according to claim 1, wherein the first transverse rib has a wall thickness larger than that of any of other transverse ribs, and has a fillet expanding to the design back surface side provided in a portion in which the transverse rib connects with the design back surface.

3. The molded plastic part according to claim 2, wherein the wall thickness of the longitudinal rib is smaller than the wall thickness of the body, and the interval between the first transverse rib and the adjacent transverse rib is greater than any of the intervals between the transverse ribs on which the gate is not set.

4. The molded plastic part according to claim 1 wherein the reinforcing structure includes a plurality of the longitudinal ribs.

5. The molded plastic part according to claim 2, wherein the reinforcing structure includes a plurality of the longitudinal ribs.

6. The molded plastic part according to claim 3 wherein the reinforcing structure includes a plurality of the longitudinal ribs.

7. The molded plastic part according to claim 1, wherein the molded plastic part is a shift lever knob garnish.

8. A molded plastic part comprising a body constituting a design surface, and a reinforcing structure projectingly provided on a design back surface of the body, the body and the reinforcing structure being monolithically molded as one piece by injection molding at one time, in one injection mold, from the same molten plastic injected through the same gate, wherein
   the reinforcing structure is formed by a combination of (i) a plurality of transverse ribs which are arranged at appropriate intervals in a longitudinal direction of the body, and each transverse rib extends in the direction intersecting with the longitudinal direction of the body; and (ii) at least one longitudinal rib which extends in the longitudinal direction of the body at right angles to the transverse ribs and connects the transverse ribs to each other,
   the transverse ribs are connected to the design back surface; one of the transverse ribs is provided as a first transverse rib on which the gate is located; and
   the at least one longitudinal rib is disposed so as to be separated from the design back surface via clearances between the at least one longitudinal rib and the design back surface, so that all resulting joined and solidified locations of the molten plastic which flowed in the injection mold lie in the reinforcing structure.

\* \* \* \* \*